(12) United States Patent
Tseng (10) Patent No.: US 11,466,722 B2
(45) Date of Patent: Oct. 11, 2022

(54) FLOATING FASTENER

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days.

(21) Appl. No.: 17/197,752

(22) Filed: Mar. 10, 2021

(65) Prior Publication Data

US 2022/0290713 A1    Sep. 15, 2022

(51) Int. Cl.
   *F16B 39/02* (2006.01)
   *F16B 5/02* (2006.01)

(52) U.S. Cl.
   CPC ............ *F16B 39/02* (2013.01); *F16B 5/0208* (2013.01)

(58) Field of Classification Search
   CPC .............................. F16B 39/02; F16B 5/0208
   See application file for complete search history.

(56) References Cited

U.S. PATENT DOCUMENTS

| | | | | |
|---|---|---|---|---|
| 5,544,992 A * | 8/1996 | Ciobanu | ............... | F16B 5/0208 411/375 |
| 6,033,168 A * | 3/2000 | Creely, III | ............ | F16B 41/002 411/107 |
| 6,079,923 A * | 6/2000 | Ross | ..................... | F16B 37/145 411/7 |
| 6,814,530 B2 * | 11/2004 | Franco | .................. | F16B 5/0208 411/970 |
| 7,938,607 B2 * | 5/2011 | Wang | .................... | F16B 5/0208 411/107 |
| 8,066,461 B2 * | 11/2011 | Travers | ................. | F16B 5/0208 411/413 |
| 8,371,786 B2 * | 2/2013 | Chiu | ..................... | F16B 5/0208 411/551 |
| 8,827,614 B2 * | 9/2014 | Tseng | .................... | F16B 5/0208 411/107 |
| 8,939,691 B2 * | 1/2015 | Tseng | ..................... | F16B 21/04 411/347 |
| 9,206,834 B2 * | 12/2015 | Tseng | .................... | F16B 5/0208 |
| 10,500,682 B2 * | 12/2019 | Wang | .................... | F16C 13/006 |
| 10,704,587 B2 * | 7/2020 | Khamithar | ............ | F16B 5/0208 |
| 10,738,809 B2 * | 8/2020 | Ito | ............................. | F16N 7/34 |
| 2005/0047889 A1 * | 3/2005 | Lee | ........................ | F16B 41/002 411/352 |

(Continued)

*Primary Examiner* — Bayan Salone (74) *Attorney, Agent, or Firm* — Muncy, Geissler, Olds & Lowe, P.C.

(57) ABSTRACT

A floating fastener includes a position-limiting cover with a perforation and a protruding butting portion, a locking member having a head, a shaft and a locking portion, a stopper having a vertical movement hole for the shaft to pass through and a plurality of locking points formed in the vertical movement hole, and a socket having an accommodating groove providing a bottom surface and a through space and a bottom positioning portion for fixation to a first preset plate. The locking portion of the locking member is inserted into the through space. The position-limiting cover outside the shaft covers the top of the socket. The stopper outside the shaft is limited to the limiting space between the protruding butting portion and the accommodating groove, and the locking portion of the locking member can be tilted and locked into a second preset plate.

8 Claims, 10 Drawing Sheets

(56) References Cited

U.S. PATENT DOCUMENTS

| | | | |
|---|---|---|---|
| 2013/0294863 A1* | 11/2013 | Tseng | F16B 5/0208 411/175 |
| 2014/0064876 A1* | 3/2014 | Tseng | F16B 5/0208 411/147 |
| 2014/0105707 A1* | 4/2014 | Tseng | F16B 21/04 411/508 |
| 2014/0119850 A1* | 5/2014 | Bentrim | F16B 29/00 411/22 |
| 2015/0071730 A1* | 3/2015 | Tseng | F16B 5/0208 411/318 |
| 2015/0260216 A1* | 9/2015 | Tseng | F16B 39/02 411/103 |

* cited by examiner

FLOATING FASTENER

BACKGROUND OF THE INVENTION

1. Field of the Invention

The present invention relates to fasteners more particularly, to a floating fastener, which is so configured that the shaft of the locking member can move horizontally or vertically in the limiting space formed by the protruding butting portion and the accommodating groove, and the shaft of the locking member uses the stopper as a fulcrum to form a tilted state, so that the floating fastener of the present invention has the ability to correct the tilt lock when combined with the first and second preset plates.

2. Description of the Related Art

Generally, when assembling and joining common plates (board-to-board), they are usually locked with positioning screws with knobs, collars and screws. The assembly procedure is to fix the screws and collars on the outer plate member first, and turn the knobs to lock the screws into the inner plate member, and then use a hand tool to fasten tight the screws, so that the outer plate member and the inner plate member are locked together as a whole. This multi-layer plate member locking mode can be applied to the field of working mother machine or other board-to-board connection plates.

However, these machine tools need to use plates to lock the joints, most of which are power devices or speed adjustment devices. The various power devices and speed adjustment devices are located inside the space formed by the machine housing. When the power unit crashes, fails, or is damaged, or when the speed adjustment device changes or adjusts the speed, remove the plate members for related maintenance and adjustment operations. The plate members are locked by a plurality of positioning screws, so it is easy to cause the positioning screws to fall off and lose during the disassembly process, and it is impossible to re-lock the plate members back to the original position, which will cause inconvenience and trouble in assembly and disassembly. In order to solve the shortcomings that the locking screws are easy to lose, some companies have developed a fixing device composed of a cap, a screw rod and a positioning block. First buckle the positioning block of the fixing device into the perforation of the plate member, and then use the screw rod to lock it to another plate member to form a fix. When the user disassemble the plate member, the fixing device can still be fixed in the perforation of the plate member through the positioning block, so that the fixing device will not fall off or lose. However, in the assembly process, the user must use force or hand tools (such as: screwdriver or wrench, etc.) to control the locking or disassembly of the fixing device. There are still many defects and problems in practical applications.

The above-mentioned fixing device does not provide any floating lock structure. When the above-mentioned fixing device is in the locking operation, if the screw rod is accidentally locked into the plate member at an inclined angle, and there is no remedy, it can only be unlocked and re-aligned and locked, while leaving a defective lock hole on the plate member. For product assembly production lines that require fast operation, the process of locking, disassembling, and relocking delays too much work time. For companies that pay attention to product production efficiency, the aforementioned factors that slow down the speed of work must be eliminated. Therefore, how to solve the above-mentioned conventional problems and deficiencies is the direction that relevant manufacturers in this industry want to study and improve.

SUMMARY OF THE INVENTION

The present invention has been accomplished under the circumstances in view. It is therefore a main object of the present invention to provide a floating fastener, which comprises a position-limiting cover, a locking member, a stopper, and a socket. The position-limiting cover comprises a perforation therein and a protruding butting portion at the bottom surface thereof. The locking member comprises a head, an operating surface provided around the periphery of the head, a shaft downwardly extending from the bottom side of the head, a locking portion located at the bottom end of the shaft, and an external thread formed on the periphery of the locking portion. The shaft and the locking portion of the locking member are inserted through the perforation of the position-limiting cover and exposed on the bottom side of the protruding butting portion. The stopper comprises a vertical movement hole for the shaft of the locking member to pass through, and a plurality of locking points formed in the vertical movement hole for the shaft to move in a vertical direction. The socket comprises an accommodating groove therein, and a positioning portion protruded from the bottom side thereof for positioning on a first preset plate. The accommodating groove comprises a bottom surface, and a through space at the center of the bottom surface. The locking portion of the locking member is inserted into the through space. The position-limiting cover outside the shaft covers the top side of the socket. The stopper outside the shaft is limited to a limiting space between the protruding butting portion of the position-limiting cover and the accommodating groove for allowing the shaft to move in a horizontal or vertical direction and in a floating state, so that the locking portion of the locking member can be tilted into a second preset plate to form a fixation. Through the aforementioned structure, the shaft of the locking member can move horizontally or vertically in the space formed by the protruding butting portion and the accommodating groove, and the shaft of the locking member uses the stopper as a fulcrum to form a tilted state, so that the floating fastener of the present invention has the ability to correct the tilt lock when combined with the first and second preset plates.

Preferably, the stopper is formed of an E-shaped ring. The E-shaped ring has the vertical movement hole at the center thereof, and an assembly port extends from the vertical movement hole to one side of the E-shaped ring for the shaft of the locking member to penetrate, and the locking points are protrudingly provided to the other side of the E-shaped ring around the center of the vertical movement hole for vertical movement or tilting of the shaft.

Preferably, the position-limiting cover further comprises a plurality of protruding teeth arranged around the periphery of the protruding butting portion for friction against the side wall of the accommodating groove when the position-limiting cover covers the top side of the socket.

Preferably, the locking member further comprises an actuating groove located on the top surface of the head for a preset hand tool to be docked. The actuating groove is a groove structure with a straight, cross or other special shape.

Preferably, the locking member further comprises a resisting surface formed on the top side of the locking portion for the bottom side of the stopper to resist. The resisting surface prevents the locking member from being separated from the stopper in a vertical direction.

Preferably, the socket further comprises a raised tooth ring arranged around the periphery of the positioning portion to increase friction. The raised tooth ring is used to increase the friction when the socket is combined with the first preset plate.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-6, a floating fastener in accordance with a first embodiment of the present invention comprises a position-limiting cover 1, a locking member 2, a stopper 3 and a socket 4. The features of these components are detailed as follows:

The position-limiting cover 1 has a perforation 10 inside, and a protruding butting portion 11 is provided on the bottom surface of the position-limiting cover 1.

The locking member 2 comprises a head 21 with an operating surface 211 on the periphery, a shaft 22 extending downward from the bottom side of the head 21, and a locking portion 23 with an external thread 231.

The shaft 22 and the locking portion 23 of the locking member 2 pass through the perforation 10 of the position-limiting cover 1 and are exposed on the bottom side of the protruding butting portion 11.

The stopper 3 comprises a vertical movement hole 30 for the shaft 22 of the locking member 2 to pass through, and the vertical movement hole 30 is formed with a plurality of locking points 302 for the shaft 22 to move in the vertical direction.

The socket 4 is recessed with an accommodating groove 41, and the accommodating groove 41 comprises a bottom surface 411 and a through space 40 located at the center of the bottom surface 411. The bottom of the socket 4 is convexly provided with a positioning portion 42 that can be positioned on a first preset plate (not shown).

The locking portion 23 of the locking member 2 is inserted into the through space 40, and the position-limiting cover 1 outside the shaft 22 covers the top side of the socket 4 and forms a positioning, and the stopper 3 outside the shaft 22 is limited to the protruding butting portion 11 of the position-limiting cover 1 and a limiting space 410 of the accommodating groove 41, so that the locking portion 23 of the locking member 2 can be tilted and locked into a second preset plate (not shown) to form a floating fastener.

The protruding butting portion 11 of the position-limiting cover 1 is further provided with a plurality of protruding teeth 111. The protruding teeth 111 are provided for the friction force against the side wall of the accommodating groove 41 when the position-limiting cover 1 covers the top side of the socket 4.

The top surface of the head 21 of the locking member 2 is further concavely provided with an actuating groove 210 for a preset hand tool (not shown, such as a screwdriver) to be docked, and the actuating groove 210 is a groove structure with a straight, cross or other special shape (for example: star-shaped, plum blossom-shaped with tamper-proof and anti-theft shapes). The top side of the locking portion 23 of the locking member 2 is formed with a resisting surface 232 for the bottom side of the stopper 3 to resist. The resisting surface 232 prevents the locking member 2 from being separated from the stopper 3 in a vertical direction.

The stopper 3 is composed of an E-shaped ring, the center of the E-shaped ring has the vertical movement hole 30, and an assembly port 301 extends from the vertical movement hole 30 to one side of the ring for the shaft 22 of the locking member 2 to penetrate, and the locking points 302 are protrudingly provided to the other side of the ring around the center of the vertical movement hole 30 for vertical movement or tilting of the shaft 22. The stopper 3 is not limited to the aforementioned E-ring structure, for example: C-rings or annular gaskets that can achieve a vertical limit to the shaft 22 are all within the protection scope of the present invention.

The outer edge of the positioning portion 42 of the socket 4 is further provided with a raised tooth ring 421, which is used to increase the friction when the socket 4 is combined with the first preset plate.

Figure 1:
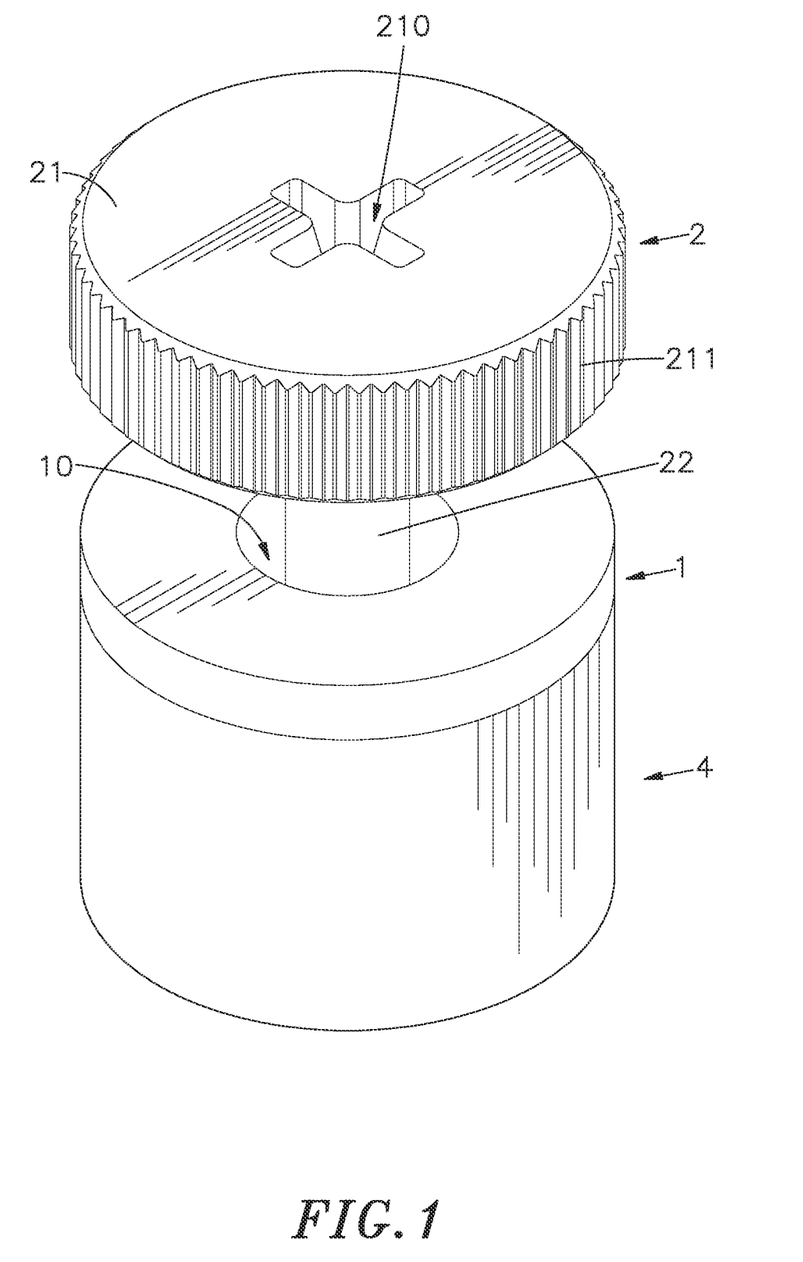
FIG. 1 is an oblique top elevational view of a floating fastener in accordance with a first embodiment of the present invention.
Figure 2:
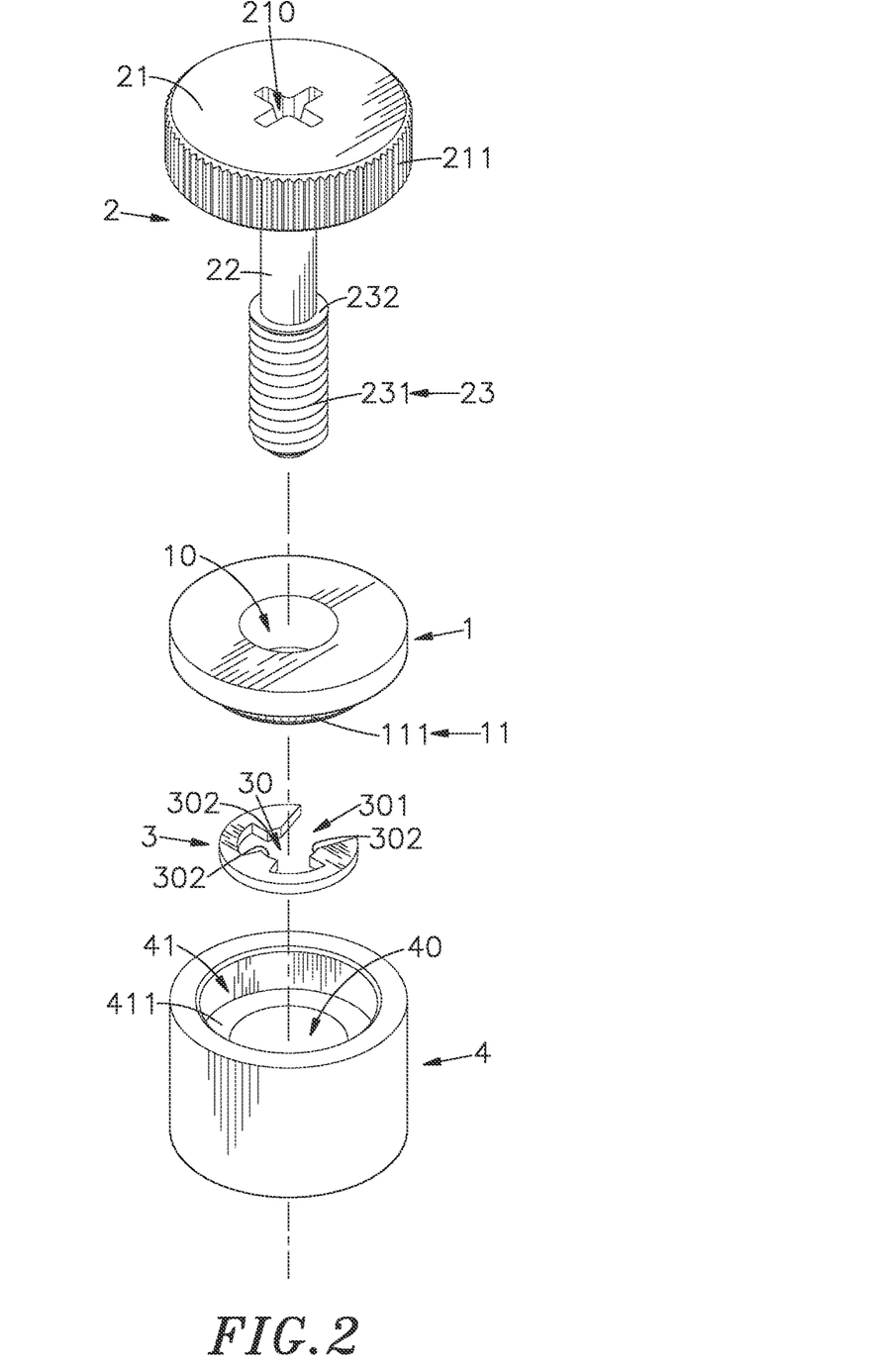
FIG. 2 is an exploded view of the floating fastener in accordance with the first embodiment of the present invention.
Figure 3:
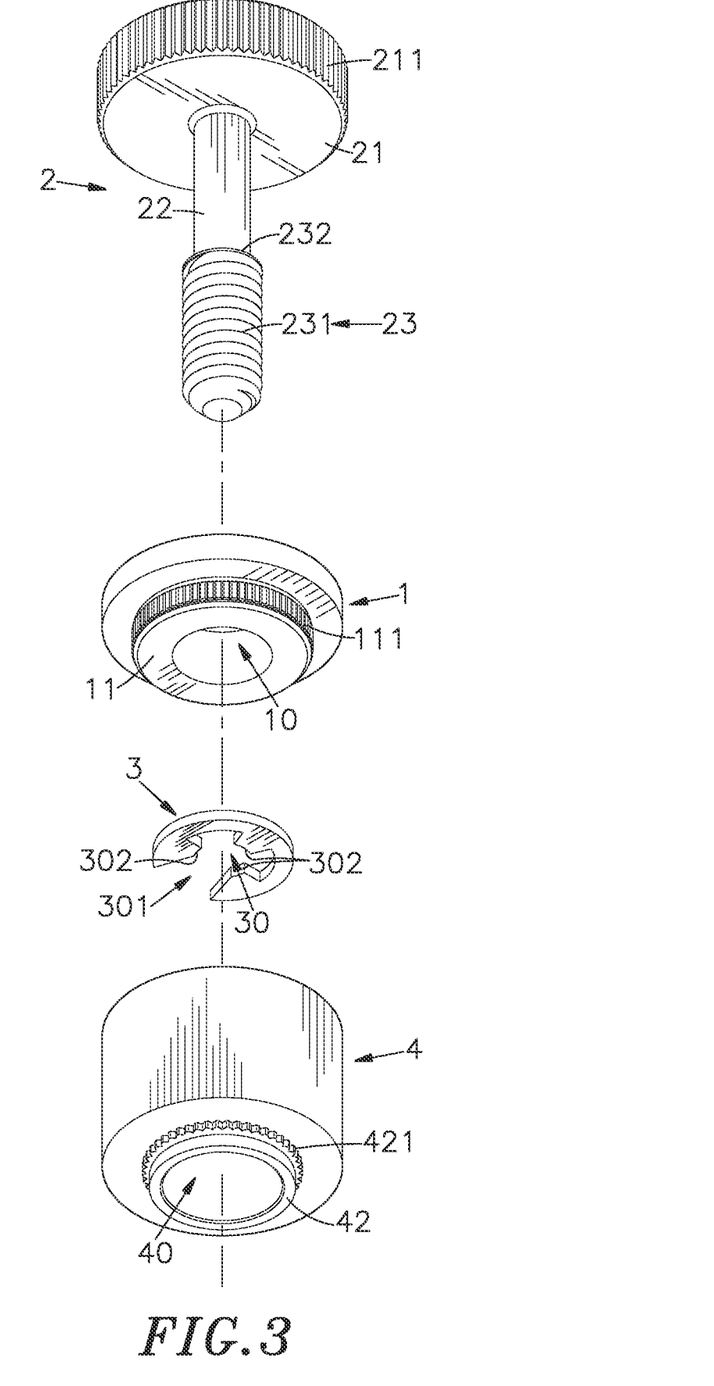
FIG. 3 corresponds to FIG. 2 when viewed from another angle.
Figure 4:
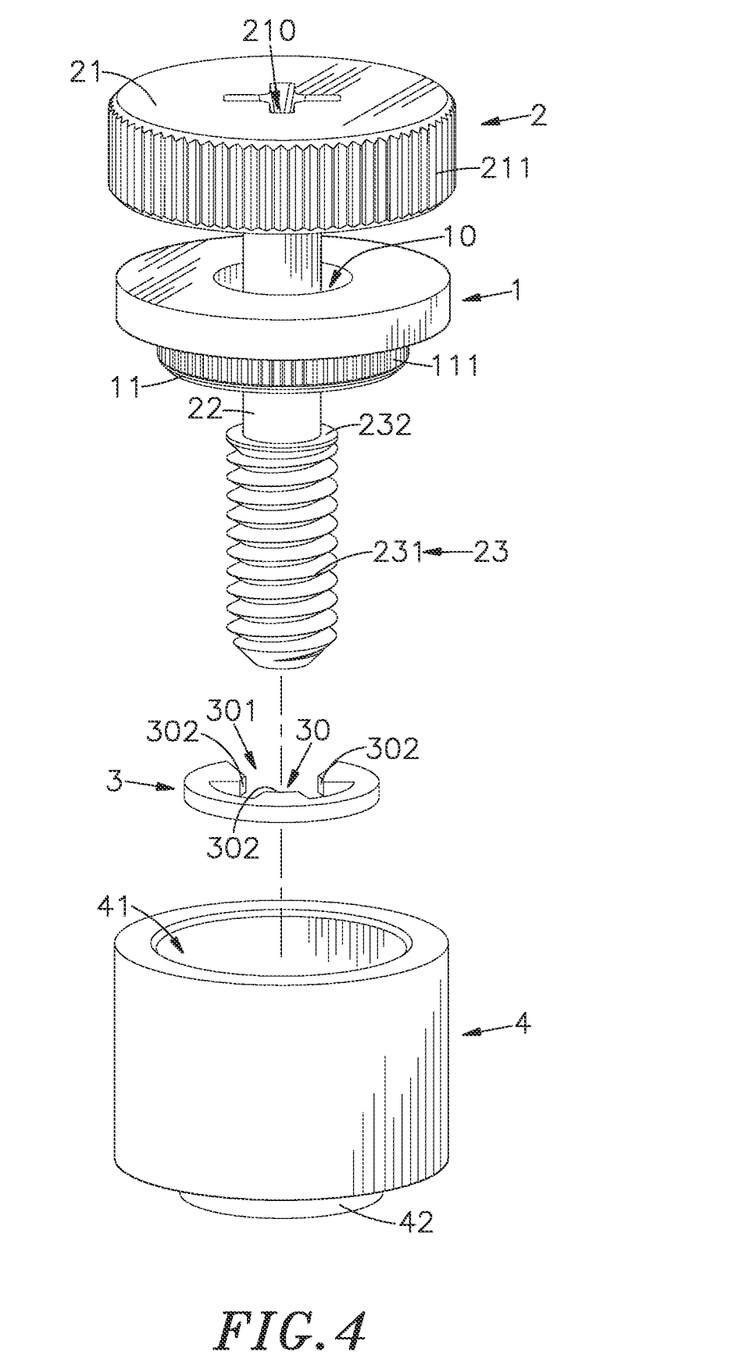
FIG. 4 is a schematic diagram of a first action of the assembling operation of the floating fastener in accordance with the first embodiment of the present invention.
Figure 5:
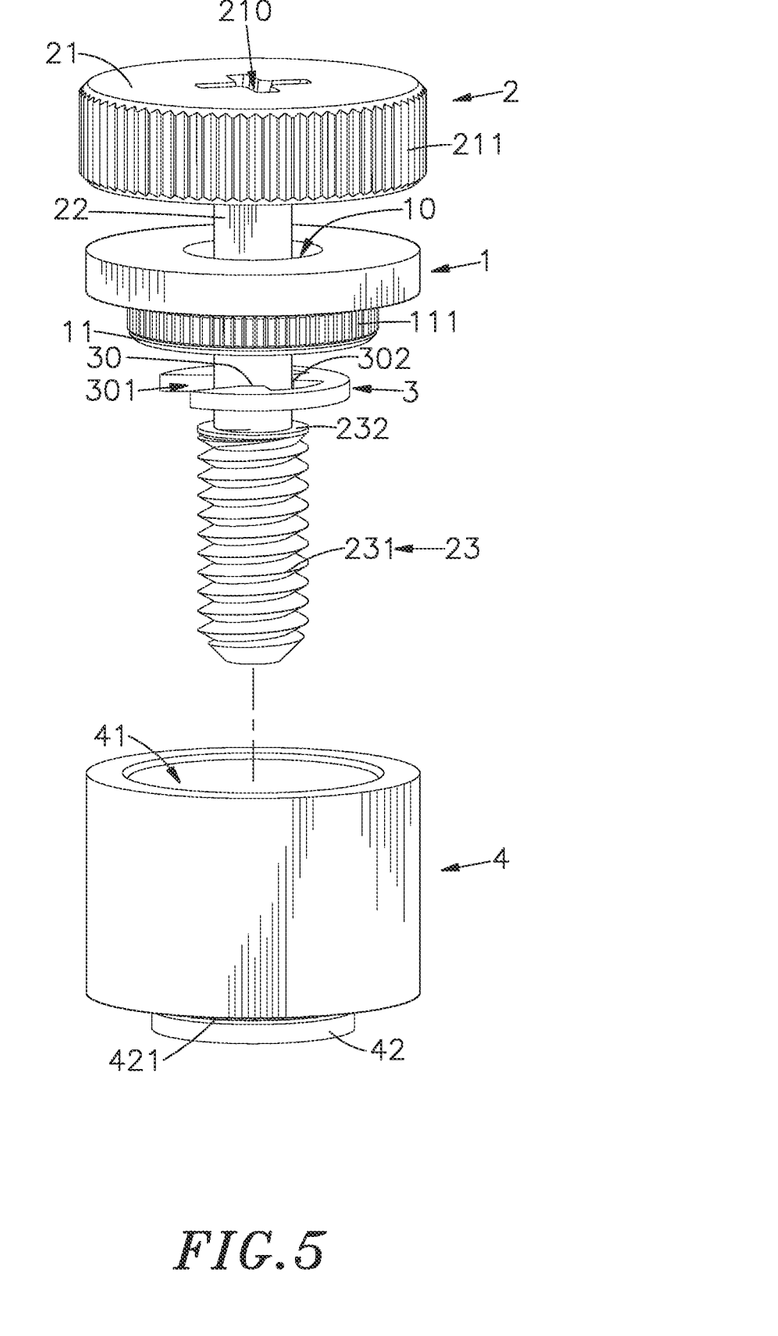
FIG. 5 is a schematic diagram of a second action of the assembling operation of the floating fastener in accordance with the first embodiment of the present invention.
Figure 6:
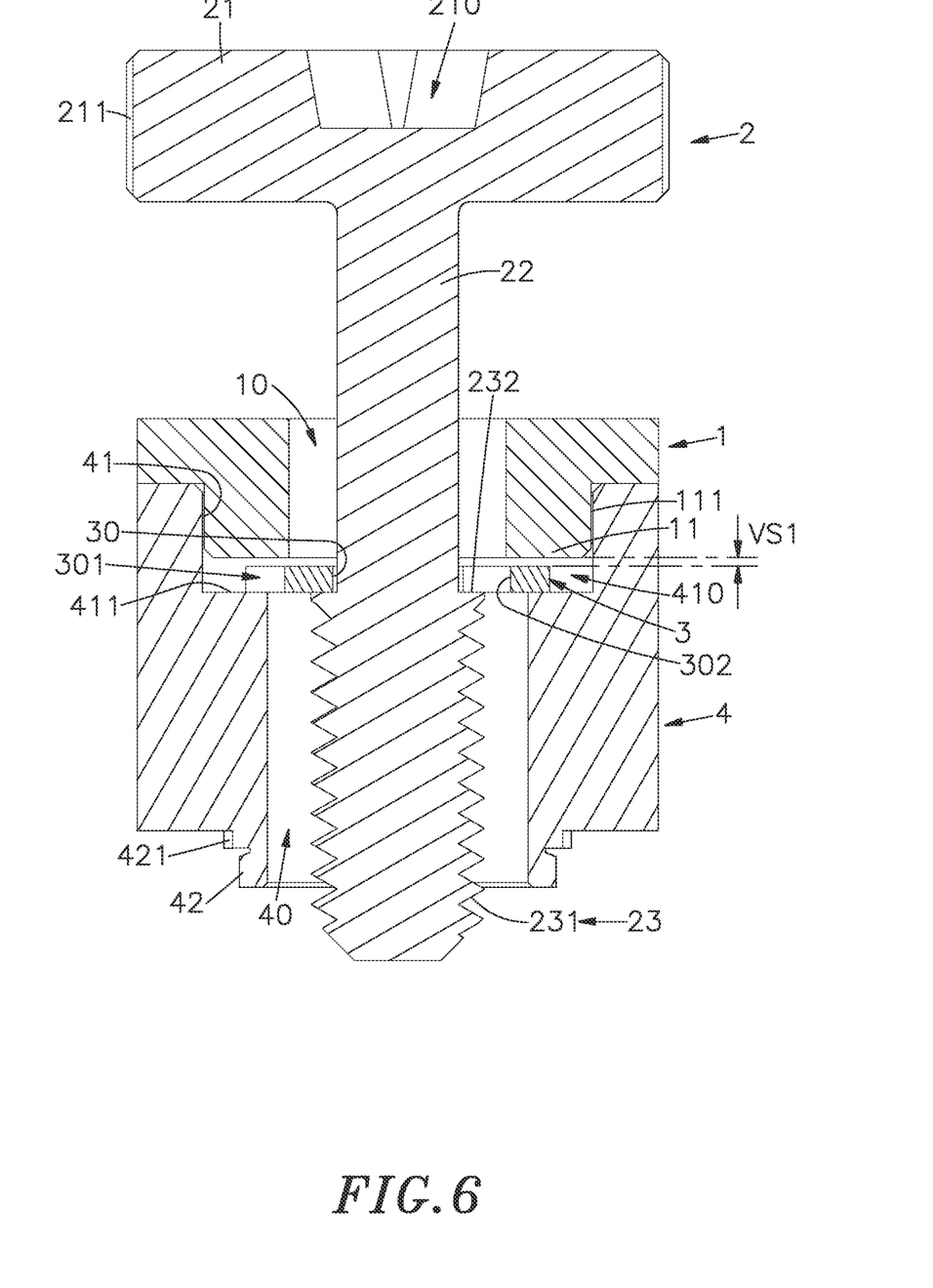
FIG. 6 is a sectional side view of the floating fastener in accordance with the first embodiment of the present invention.
Figure 7:
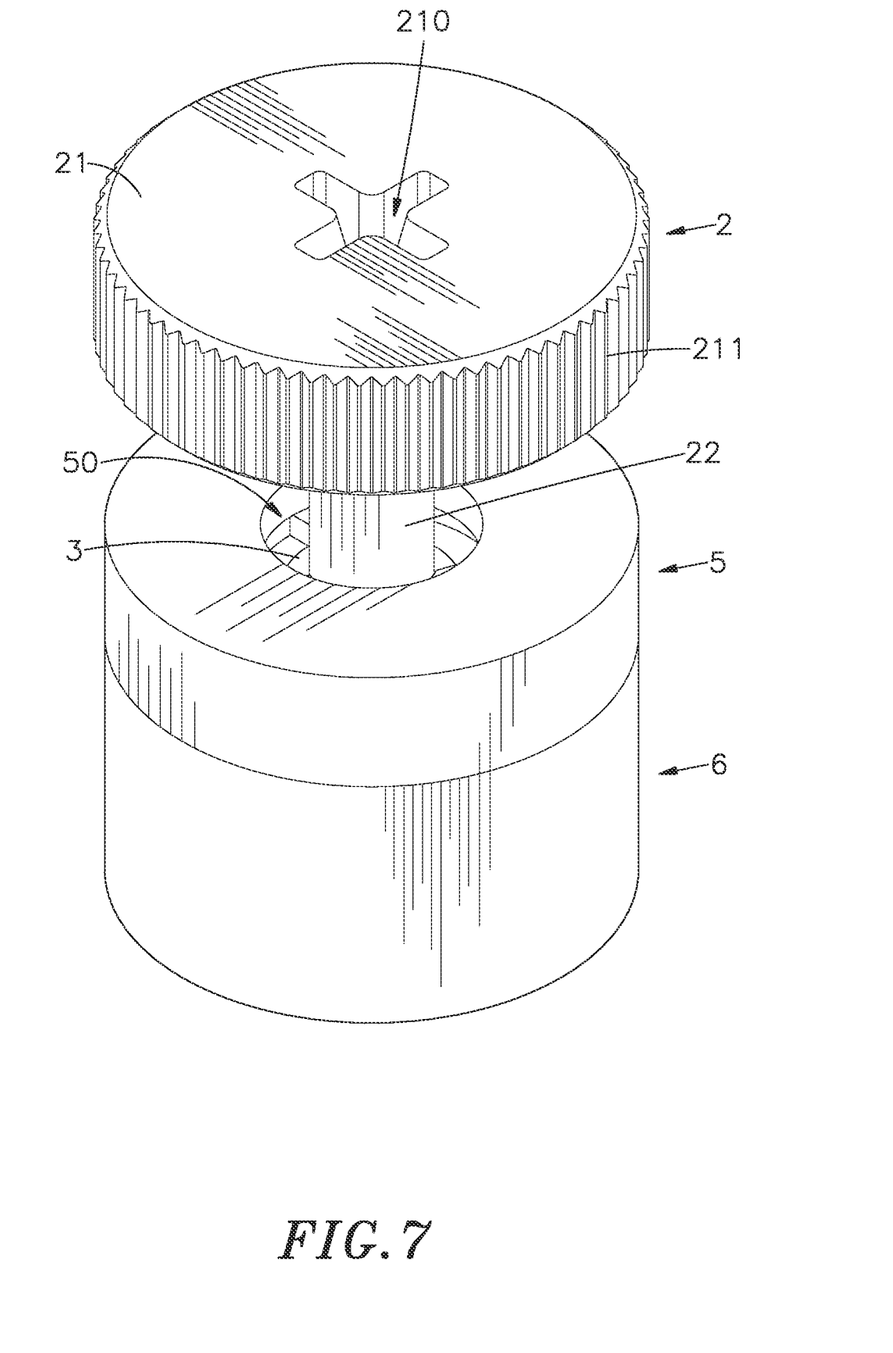
FIG. 7 is an oblique top elevational view of a floating fastener in accordance with a second embodiment of the present invention.
Figure 8:
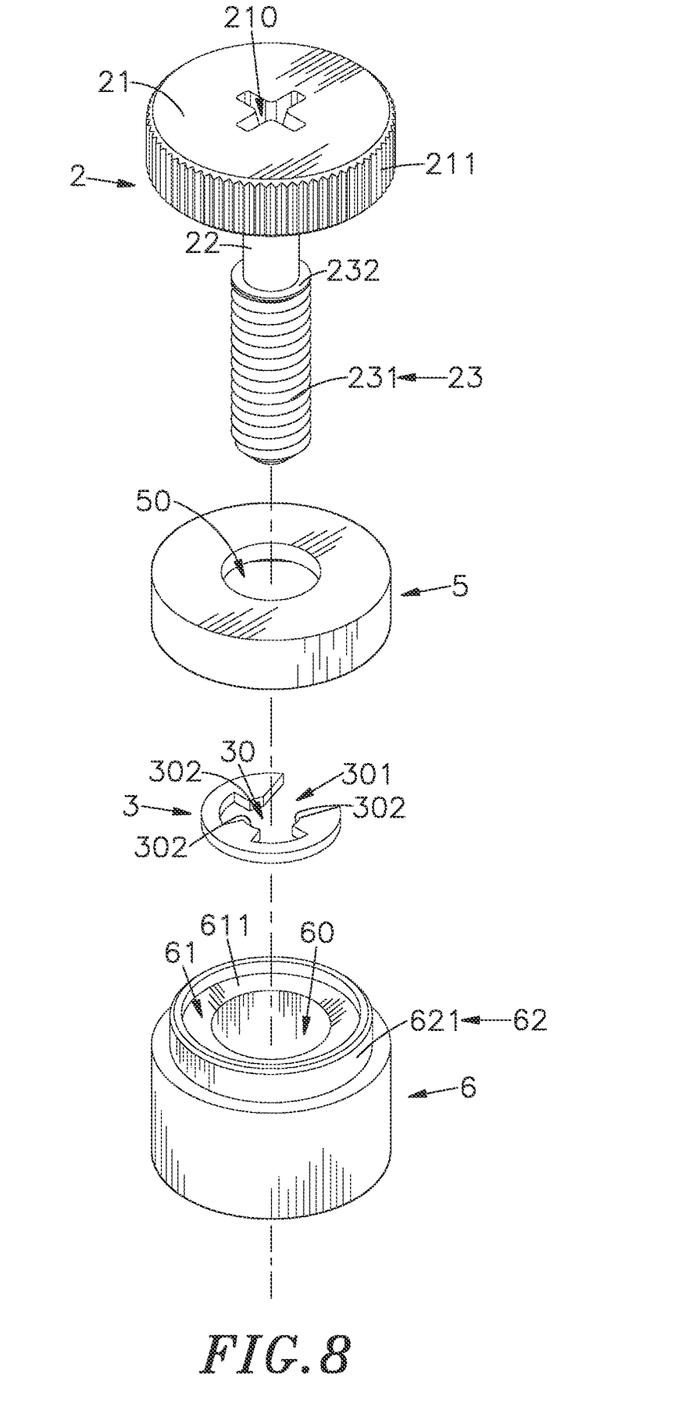
FIG. 8 is an exploded view of the floating fastener in accordance with the second embodiment of the present invention.
Figure 9:
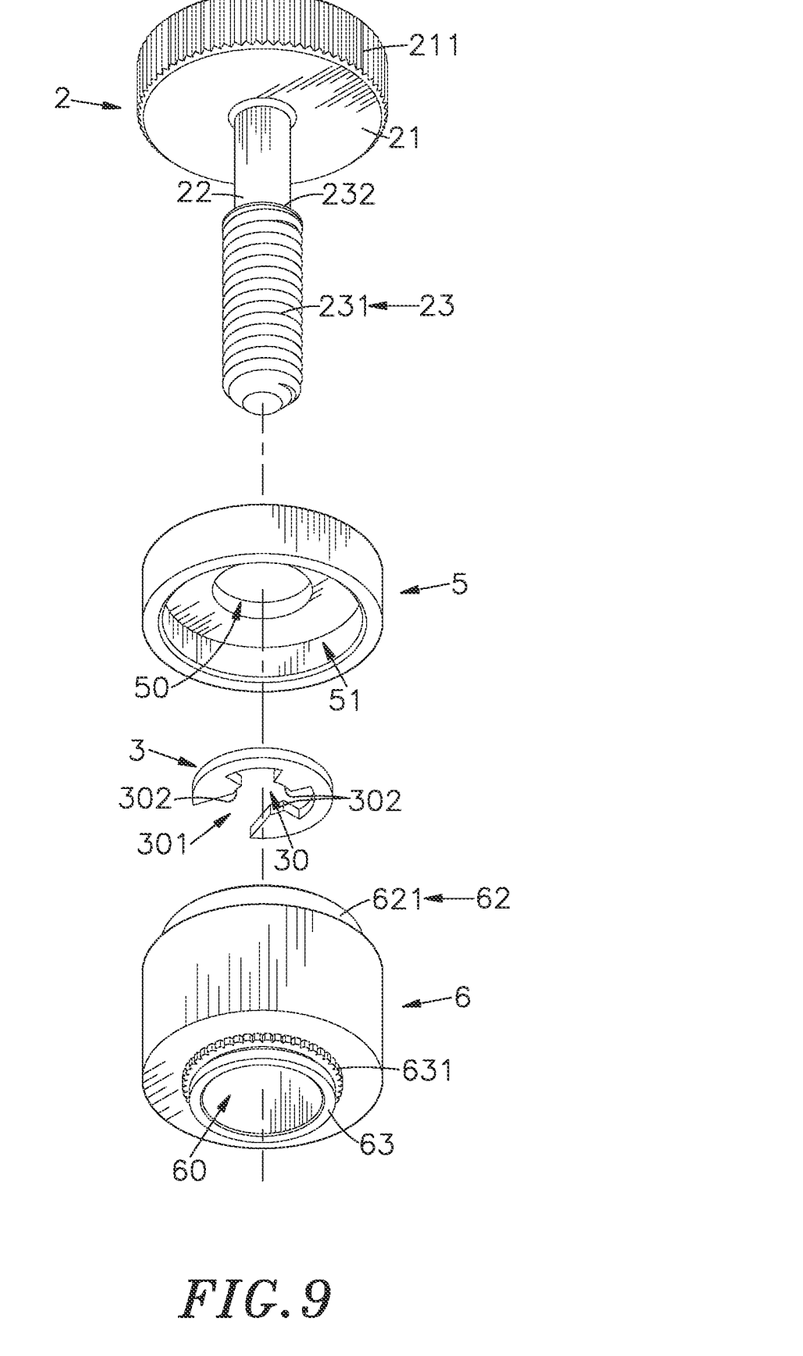
FIG. 9 corresponds to FIG. 8 when viewed from another angle.
Figure 10:
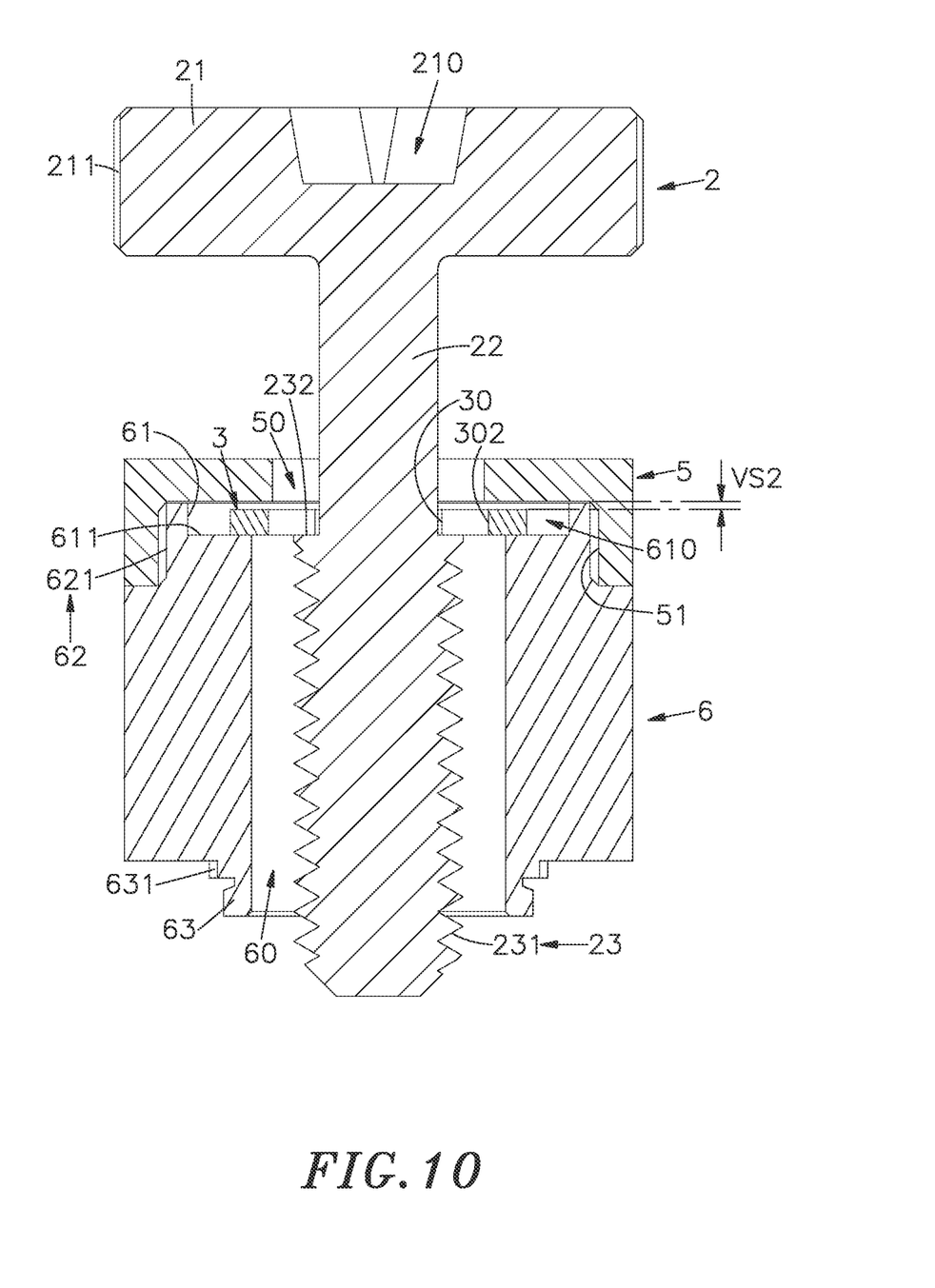
FIG. 10 is a sectional side view of the floating fastener in accordance with the second embodiment of the present invention.

To assemble the floating fastener of the first embodiment of the present invention, the shaft 22 and the locking portion 23 of the locking member 2 are inserted into the perforation 10 of the position-limiting cover 1 and exposed to the bottom side of the protruding butting portion 11 (as shown in FIG. 4), and then the assembly port 301 of the stopper 3 is aligned with the shaft 22 of the locking member 2 and snapped into position to locate the bottom side of the stopper 3 on the top side of the resisting surface 232 of the locking member 2 (as shown in FIG. 5), and then the locking portion 23 of the locking member 2 is put in the through space 40 of the socket 4 to make the position-limiting cover 1 outside the shaft 22 cover the top side of the socket 4, so that the protruding teeth 111 of the protruding butting portion 11 are abutted against the vertical wall surface of the accommodating groove 41, and the stopper 3 outside the shaft 22 is limited between the protruding butting portion 11 and the bottom surface 411 of the accommodating groove 41. At this time, there is a first vertical spacing VS1 between the top surface of the stopper 3 and the bottom surface of the protruding butting portion 11 (as shown in FIG. 6). The assembly operation of the floating fastener of the present invention is completed by the foregoing actions.

The floating fastener of the present invention can be applied to non-metallic plates or metal plates in actual operation. The specific method is to first penetrate the positioning portion 42 of the socket 4 into the preset positioning hole of the first preset plate (sheet), and then apply pressure riveting, reaming or surface welding technology (SMT) to the positioning portion 42 to join and fix the socket 4 and the first preset plate (sheet) together. At this time, place the second preset plate (sheet) to be fixed on the bottom side of the first preset plate (sheet), and then turn the operating surface 211 of the locking member 2 in a clockwise (or counterclockwise) direction to pre-lock the locking portion 23 of the locking member 2 in the preset positioning hole of the second preset plate (sheet). Then use a preset hand tool (such as a screwdriver) to connect to the actuating groove 210 of the locking member 2, and continue to apply force to lock the locking portion 23 of the locking member 2 into the predetermined position in the preset positioning hole. By the foregoing operations to complete the use of the floating fastener of the present invention to lock the first preset plate (sheet) and the second preset plate (sheet).

The above is the standard locking operation of the floating fastener of the present invention, but during the locking process, it is inevitable that the locking member 2 will be accidentally locked into the preset positioning hole of the second preset plate (sheet) at an oblique angle. At this time, the shaft 22 of the locking member 2 moves in a horizontal or vertical floating state in the limiting space 410 formed by the bottom side of the protruding butting portion 11 and the accommodating groove 41. The vertical direction is the first vertical spacing VS1 between the top surface of the stopper 3 and the bottom surface of the protruding butting portion 11. In addition, the shaft 22 of the locking member 2 uses the stopper 3 as a fulcrum to form a tilted state, so as to achieve the correcting ability of tilting locking when the floating fastener of the present invention is combined with the preset first and second plates (sheets). Without disassembling the locking member 2 for re-locking, you can adjust the locking member 2 back to the position perpendicular to the preset second plate (sheet), and continue to apply force to lock the locking portion 23 of the locking member 2 into the predetermined position in the preset positioning hole to complete the first preset plate (sheet) and the second preset plate (sheet) locking correction operation using the floating fastener of the present invention.

Referring to FIGS. 7-10, a floating fastener in accordance with a second embodiment of the present invention comprises a position-limiting cover 5, a locking member 2, a stopper 3 and a socket 6. The features of these components are detailed as follows:

The position-limiting cover 5 comprises a perforation 50, and bottom accommodation chamber 51 in communication with the perforation 50.

The locking member 2 comprises a head 21 with an operating surface 211 on the periphery, a shaft 22 extending downward from the bottom side of the head 21, and a locking portion 23 with an external thread 231. The shaft 22 and the locking portion 23 of the locking member 2 pass through the perforation 50 of the position-limiting cover 5.

The stopper 3 comprises a vertical movement hole 30 for the shaft 22 of the locking member 2 to pass through, and the vertical movement hole 30 is formed with a plurality of locking points 302 for the shaft 22 to move in the vertical direction.

The socket 6 is recessed with an accommodating groove 61, and the accommodating groove 61 comprises a bottom surface 611 and a through space 60 located at the center of the bottom surface 611. On the top side of the socket 6 is a raised portion 62 with a smaller circular diameter. A positioning wall 621 is formed outside the raised portion 62. The bottom of the socket 6 is convexly provided with a positioning portion 63 that can be positioned on a first preset plate (not shown). The locking portion 23 of the locking member 2 passes through the through space 60, and the bottom accommodation chamber 51 of the position-limiting cover 5 outside the shaft 22 covers the raised portion 62 of the socket 6 to form a tight fit positioning. The stopper 3 outside the shaft 22 is limited between the bottom accommodation chamber 51 of the position-limiting cover 5 and the accommodating groove 61, so that the locking portion 23 of the locking member 2 can be tilted and locked into a second preset plate (not shown) to form a floating fastener.

The top surface of the head 21 of the locking member 2 is further concavely provided with an actuating groove 210 for a preset hand tool (not shown, such as a screwdriver) to be docked, and the actuating groove 210 is a groove structure with a straight, cross or other special shape (for example: star-shaped, plum blossom-shaped with tamper-proof and anti-theft shapes). The top side of the locking portion 23 of the locking member 2 is formed with a resisting surface 232 for the bottom side of the stopper 3 to resist. The resisting surface 232 prevents the locking member 2 from being separated from the stopper 3 in a vertical direction.

The outer edge of the positioning portion 63 of the socket 6 is further provided with a raised tooth ring 631, which is used to increase the friction when the socket 6 is combined with the first preset plate.

The second embodiment disclosed in FIGS. 7 to 10 is similar to the first embodiment disclosed in FIGS. 1 to 6, except that the socket 6 of the second embodiment is additionally provided a raised portion 62. The overall position of accommodating groove 61 can be raised by the design of the raised portion 62. After the bottom accommodation chamber 51 of the position-limiting cover 5 and the socket 6 are tightly aligned and positioned, the limiting space 610 formed between the bottom accommodation chamber 51 of the position-limiting cover 5 and the accommodating groove 61 is for the horizontal movement of the stopper 3. The vertical direction of movement is a second vertical spacing VS2 on the top surface of stopper 3 and the top surface of bottom accommodation chamber 51. After the accommodating groove 61 is raised, the shaft 22 of locking member 2 that uses the stopper 3 as the tilt fulcrum is raised accordingly, so the tilt angle of the locking member 2 becomes larger. When using the second embodiment of the present invention to lock and correct the first preset plate and the second preset plate, a larger tilt correction angle can be obtained, so its application range is wider. As for the assembly and operation method of the second embodiment, it is the same as the first embodiment, so it is not repeated here.

According to the disclosure of the above FIGS. 1 to 10, it can be understood that the present invention is a floating fastener, which comprises: a position-limiting cover comprising a perforation therein and a protruding butting portion located on a bottom surface thereof; a locking member comprising a head, a shaft downwardly extending from the bottom side of the head and a locking portion at the bottom end of the shaft; a stopper comprising a vertical movement hole for the shaft of the locking member to pass through, and a plurality of locking points formed in the vertical movement hole; and a socket comprising an accommodating groove therein and a positioning portion at the bottom side thereof for fixation to a first preset plate, the accommodating groove providing a bottom surface and a through space. The locking portion of the locking member is inserted into the through space. The position-limiting cover outside the shaft covers the top of the socket. The stopper outside the shaft is limited to the limiting space between the protruding butting portion and the accommodating groove, and the locking portion of the locking member can be tilted and locked into a second preset plate. With the aforementioned structure, the shaft of the locking member can move horizontally or vertically in the space formed by the protruding butting portion and the accommodating groove. The shaft of the locking member uses the stopper as the fulcrum to form a tilted state, so that the floating fastener of the present invention has the ability to correct the inclined locking when combined with the first and second preset plates. The present invention is applied in the field of assembling two plates (sheets), and has excellent practical functions, so a patent application is filed to seek protection of the patent right.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A floating fastener, comprising:
a position-limiting cover comprising a perforation therein and a protruding butting portion at a bottom surface thereof;
a locking member comprising a head, an operating surface provided around the periphery of said head, a shaft downwardly extending from a bottom side of said head, a locking portion located at a bottom end of said shaft and an external thread formed on the periphery of said locking portion, said shaft and said locking portion of said locking member being inserted through said perforation of said position-limiting cover and exposed on a bottom side of said protruding butting portion;
a stopper comprising a vertical movement hole for said shaft of said locking member to pass through, and a plurality of locking points formed in said vertical movement hole for said shaft to move in a vertical direction; and
a socket comprising an accommodating groove therein and a positioning portion protruded from a bottom side thereof for positioning on a first preset plate, said accommodating groove comprising a bottom surface and a through space at the center of said bottom surface;
wherein said locking portion of said locking member is inserted into said through space; said position-limiting cover outside said shaft covers a top side of said socket; said stopper outside said shaft is limited to a limiting space between said protruding butting portion of said position-limiting cover and said accommodating groove for allowing said shaft to move in a horizontal or vertical direction and in a floating state, so that said locking portion of said locking member is tiltable into a second preset plate to form a fixation;
wherein said stopper is formed of an E-shaped ring, said E-shaped ring comprising said vertical movement hole at the center thereof, an assembly port extending from said vertical movement hole to one side of said E-shaped ring for said shaft of said locking member to penetrate and said locking points protrudingly provided to the other side of said E-shaped ring around the center of said vertical movement hole for vertical movement or tilting of said shaft.

2. The floating fastener as claimed in claim 1, wherein said position-limiting cover further comprises a plurality of protruding teeth arranged around the periphery of said protruding butting portion for friction against a side wall of said accommodating groove when said position-limiting cover covers a top side of said socket.

3. The floating fastener as claimed in claim 1, wherein said locking member further comprises an actuating groove located on a top surface of said head for a preset hand tool to be docked, said actuating groove being a groove structure with a straight or cross shape selectively.

4. The floating fastener as claimed in claim 1, wherein said locking member further comprises a resisting surface formed on a top side of said locking portion for a bottom side of said stopper to resist, said resisting surface preventing said locking member from being separated from said stopper in a vertical direction.

5. The floating fastener as claimed in claim 1, wherein said socket further comprises a raised tooth ring arranged around the periphery of said positioning portion and used to increase the friction when said socket is combined with said first preset plate.

6. A floating fastener, comprising:
a position-limiting cover comprising a perforation therein and a bottom accommodation chamber in a bottom side thereof in communication with said perforation;
a locking member comprising a head, an operating surface provided around the periphery of said head, a shaft downwardly extending from a bottom side of said head, a locking portion located at a bottom end of said shaft and an external thread formed on the periphery of said locking portion, said shaft and said locking portion of said locking member being inserted through said perforation of said position-limiting cover;
a stopper comprising a vertical movement hole for said shaft of said locking member to pass through, and a plurality of locking points formed in said vertical movement hole for said shaft to move in a vertical direction; and
a socket comprising an accommodating groove therein, a positioning portion protruded from a bottom side thereof for positioning on a first preset plate and a raised portion with a relatively smaller circular diameter located at a top side thereof, said accommodating groove comprising a bottom surface and a through space at the center of said bottom surface;
wherein said locking portion of said locking member is inserted into said through space; said bottom accommodation chamber of said position-limiting cover outside said shaft covers said raised portion of said socket to form a tight fit positioning;
said stopper outside said shaft is limited to a limiting space between a protruding butting portion of said position-limiting cover and said accommodating groove for allowing said shaft to move in a horizontal or vertical direction and in a floating state, so that said locking portion of said locking member is tiltable into a second preset plate to form a fixation;

wherein said locking member further comprises a resisting surface formed on a top side of said locking portion for a bottom side of said stopper to resist, said resisting surface preventing said locking member from being separated from said stopper in a vertical direction.

7. The floating fastener as claimed in claim 6, wherein said locking member further comprises an actuating groove located on a top surface of said head for a preset hand tool to be docked, said actuating groove being a groove structure with a straight or cross shape selectively.

8. The floating fastener as claimed in claim 6, wherein said socket further comprises a raised tooth ring arranged around the periphery of said positioning portion and used to increase the friction when said socket is combined with said first preset plate.

* * * * *